(12) United States Patent
Beck

(10) Patent No.: US 11,509,684 B2
(45) Date of Patent: *Nov. 22, 2022

(54) METHOD AND APPARATUS FOR OUT OF PATH BORDER GATEWAY PROTOCOL VALIDATION

(71) Applicant: Charter Communications Operating, LLC, St. Louis, MO (US)

(72) Inventor: Jody Beck, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/469,956

(22) Filed: Sep. 9, 2021

(65) Prior Publication Data

US 2021/0409443 A1    Dec. 30, 2021

Related U.S. Application Data

(63) Continuation of application No. 16/590,664, filed on Oct. 2, 2019, now Pat. No. 11,146,587.

(51) Int. Cl.
*G06F 17/00* (2019.01)
*H04L 29/06* (2006.01)
*H04L 9/40* (2022.01)

(52) U.S. Cl.
CPC ...... *H04L 63/1441* (2013.01); *H04L 63/0263* (2013.01); *H04L 63/105* (2013.01); *H04L 63/18* (2013.01)

(58) Field of Classification Search
CPC ............ H04L 63/1441; H04L 63/0263; H04L 63/105; H04L 63/18; H04L 45/02; H04L 45/04; H04L 63/0236
See application file for complete search history.

(56) References Cited

U.S. PATENT DOCUMENTS

| | | | |
|---|---|---|---|
| 7,826,456 B2* | 11/2010 | Li | H04L 45/02 370/398 |
| 7,930,424 B1* | 4/2011 | Nucci | H04L 45/04 709/238 |
| 10,432,503 B1* | 10/2019 | Rzehak | H04L 45/02 |
| 2014/0082216 A1* | 3/2014 | Patel | H04L 45/42 709/242 |

* cited by examiner

*Primary Examiner* — Amie C. Lin
(74) *Attorney, Agent, or Firm* — Young Basile Hanlon & MacFarlane, P.C.

(57) ABSTRACT

Methods and systems for service integrated domain name servers are described. A method for out of path border gateway protocol (BGP) validation includes receiving, at a network component, a prefix announcement. The network component denies acceptance of the prefix announcement. A BGP monitor at the network component sends the prefix announcement to an out of path validation controller. The out of path validation controller evaluates the prefix announcement against one or more validation tests, sends a validation notification based on the one or more validation tests, and programs the network component for a validated prefix announcement.

20 Claims, 9 Drawing Sheets

METHOD AND APPARATUS FOR OUT OF PATH BORDER GATEWAY PROTOCOL VALIDATION

CROSS REFERENCE TO RELATED APPLICATION

This application is a continuation of U.S. application Ser. No. 16/590,664 filed Oct. 2, 2019, of which is incorporated herein by reference.

TECHNICAL FIELD

This disclosure relates to communications networks.

BACKGROUND

Internet Service Providers (ISPs) and communication networks, such as Internet connected networks, frequently face the threat of Border Gateway Protocol (BGP) attacks. In a BGP attack, a malicious attacker causes Internet traffic, for example, to be misrouted and/or mishandled by manipulating BGP routing data. The misrouting and/or mishandling of Internet traffic due to BGP hijacks represents a significant security threat to ISPs and communication networks, as well as users. For example, traffic can be forwarded through malicious computing devices and/or is often not forwarded to its intended destination.

SUMMARY

Disclosed herein are methods and systems for out of path border gateway protocol validation. A method for out of path border gateway protocol (BGP) validation includes receiving, at a network component, a prefix announcement. The network component denies acceptance of the prefix announcement. A BGP monitor at the network component sends the prefix announcement to an out of path validation controller. The out of path validation controller evaluates the prefix announcement against one or more validation tests, sends a validation notification based on the one or more validation tests, and programs the network component for a validated prefix announcement.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
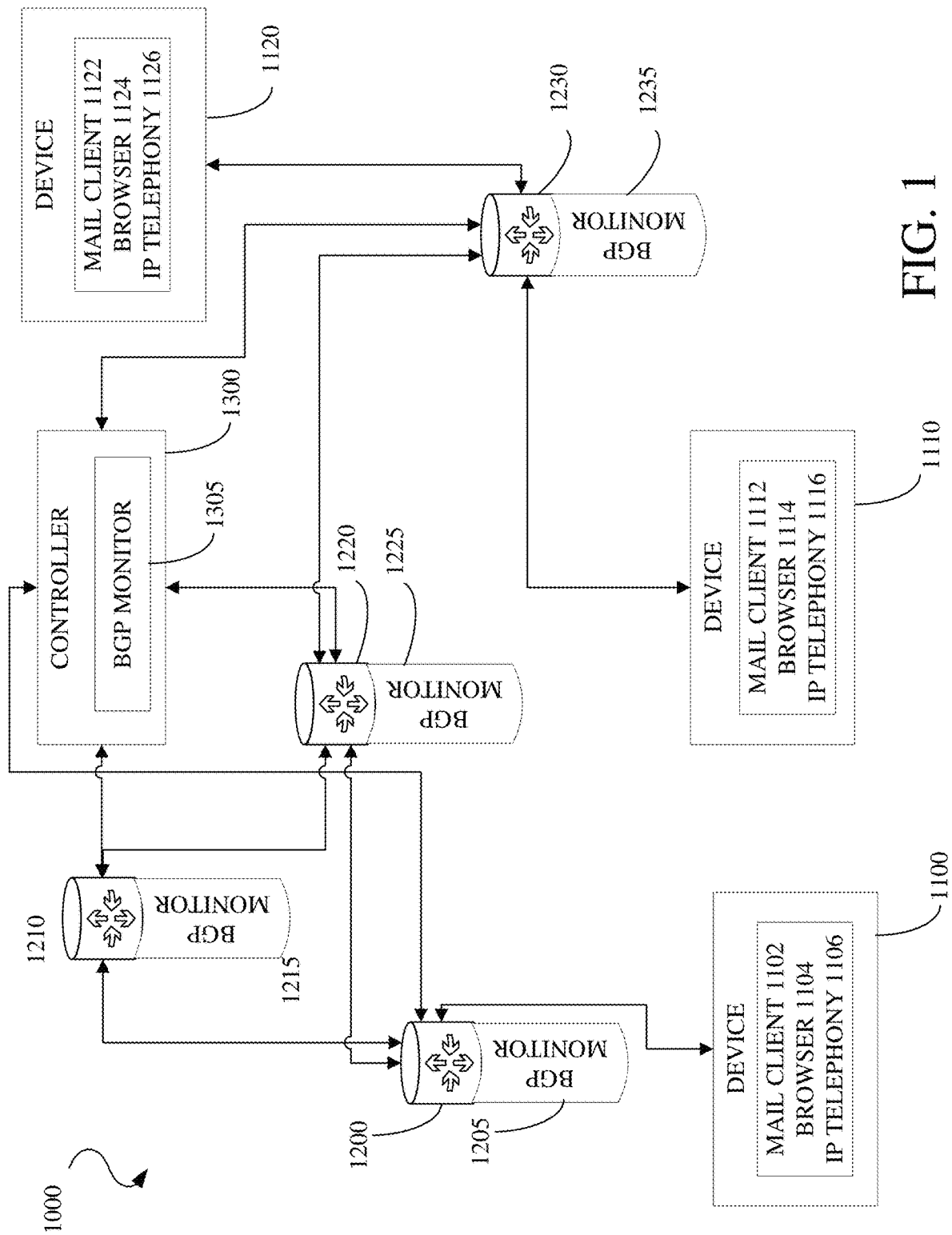
FIG. 1 is a diagram of an example architecture of an out of path border gateway protocol validation in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

An autonomous system (AS) is a network or group of networks under common administration and with common routing policies, where an AS may be associated with a service provider, for example. The service provider may route network traffic via the AS from an origin network to a destination network. An AS is assigned a range of Internet Protocol (IP) addresses, i.e., a netblock. A prefix refers to a representation for a block of IP addresses. Prefixes may be expressed as "prefix/#most significant bits." For example, the prefix 10.0.0.0/16 has 16 significant bits, and thus represents all of the IP addresses between 10.0.0.0/16 and 10.0.255.255 inclusive. The AS may advertise or announce that the netblock is reachable by announcing a route to the AS with a route prefix for the netblock in a border gateway protocol (BGP) update. A route prefix may indicate a netblock's IP address prefix and a length of the IP address prefix as a number of bits. For example, an AS assigned the netblock "10.0.0.0/16" may cause traffic to be routed to it by sending a BGP update from its routers (e.g., peer routers, edge routers, etc.) announcing a route with the route prefix "10.0.0.0/16".

Routing information must be exchanged to facilitate routing of the network traffic. BGP is an exterior gateway protocol (EGP) that is used to exchange routing information among network components (e.g., routers) in the same or different autonomous systems. BGP lacks an inherent security mechanism for verifying the authenticity and authority of BGP control traffic and consequently are subject to the threat of intentional and unintentional security breaches and cyberattacks. One common form of attack is a BGP hijack in which a nefarious or malicious actor may manipulate BGP routing data to cause Internet traffic to be misrouted.

Described herein are methods, devices and systems for out of path BGP validation which provides new and improved BGP security solutions beneficial to autonomous networks, service provider networks, network related components and devices, and customer premise or user equipment devices that provide or use the networks or AS. In an implementation, an out of path BGP validation controller receives prefix announcements from a network component, such as a router, where the router has denied acceptance of the prefix announcement to prevent processing by the network component prior to validation by the out of path BGP validation controller. The described process allows robust validation using more available methods than could be achieved by doing the validation on the router, for example.

Use of the out of path BGP validation controller moves the decision to accept routes off of the network component and onto a platform dedicated for route validation. In an implementation, the out of path BGP validation controller reviews and analyzes multiple points of data and combines that data to determine the likelihood of a prefix announcement being valid or not. This provides a more rigorous approach in contrast to fail and pass based on simple criteria.

In an implementation, a BGP monitor forwards a prefix announcement to the out of path BGP validation controller without acceptance of the prefix announcement by the network component. The out of path BGP validation controller analyzes the routing data related to or associated with the prefix announcement and sends a notification to the network component. In an implementation, the out of path BGP validation controller sends positive validations. In an implementation, the notification is sent via the BGP monitor or an application programming interface (API).

The description herein uses BGP, OpenBMP, OpenBGP, and other protocols. The discussions of these and other protocols are illustrative and are not intended to limit the implementations in any way. Other protocols may be used with the various implementations, and the other protocols may be substituted in the examples without departing from the scope of the specification and/or claims.

FIG. 1 is a diagram of an example architecture 1000 using an out of path BGP validation controller 1300 in accordance with implementations or embodiments of this disclosure. In an implementation, the architecture 1000 may include computing devices 1100, 1110, and 1120, routers 1200, 1210, 1220, and 1230, and the out of path BGP validation controller 1300. The computing devices 1100, 1110, and 1120 are connected to or in communication with (collectively "connected to") one or more of the routers 1200, 1210, 1220, and 1230. The routers 1200, 1210, 1220, and 1230 are connected to an out of path BGP controller, such as the out of path BGP validation controller 1300. In an implementation, some of the routers 1200, 1210, 1220, and 1230 are interconnected with each other. The number of controllers is illustrative and there may be multiple controllers depending on the number of routers, geographic characteristics, traffic characteristics, and the like. In an implementation, the connections between the computing devices 1100, 1110, and 1120, routers 1200, 1210, 1220, and 1230, and the out of path BGP validation controller 1300 may be through a network(s) (not shown). The connections between the computing devices 1100, 1110, and 1120, routers 1200, 1210, 1220, and 1230, and the out of path BGP validation controller 1300 may be wired, wireless or a combination thereof. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The network(s) may be, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and like including any combinations thereof.

The computing devices 1100, 1110, and 1120 may be, but is not limited to, customer premises equipment, end user devices, set-top boxes, personal computers (PCs), cellular telephones, Internet Protocol (IP) devices, computers, desktop computers, laptops, mobile devices, handheld computers, PDAs, personal media devices, smartphones, notebooks, notepads, phablets and the like. For example, in an implementation, each of the computing devices 1100, 1110, and 1120 may include applications such as, but not limited to, a mail application 1102, 1112, and 1122, a web browser application 1104, 1114, and 1124, an IP telephony application 1106, 1116, and 1126, and the like, respectively. The computing devices 1100, 1110, and 1120 may receive and access services from other devices via the routers 1200, 1210, 1220, and 1230.

Each of the routers 1200, 1210, 1220, and 1230 may represent one or more routers. The routers 1200, 1210, 1220, and 1230 may be associated with the same or different service providers and each router 1200, 1210, 1220, and 1230 may have its own respective autonomous system number (ASN) assigned to it to distinguish one router from another router. The routers 1200, 1210, 1220, and 1230 may make prefix announcements to exchange routing information with one another in accordance with BGP. As described herein, the routers 1200, 1210, 1220, and 1230 are preset to deny acceptance of prefix announcements. The description herein uses routers, where a router may refer to any device capable of functioning as a router, such as an edge router, a core router, a boundary router, or any other type of router. A router may be any device that may be configured to forward data, such as Internet Protocol (IP) packets, from one device to computing device. The discussions of routers are illustrative and are not intended to limit the implementations in any way. Other network components may be used with the various implementations, and the other network components may be substituted in the examples without departing from the scope of the specification and/or claims.

The controller 1300 is a device which receives and analyzes routing data associated with prefix announcements which are sent between the routers 1200, 1210, 1220, and 1230. The controller 1300 applies one or more validation tests, protocols or algorithms (collectively "validation test") to the routing data as described herein and assigns a score. In an implementation, a low score is given if the applied validation test reflects high trust in the prefix announcement and a high score is given if the applied validation test reflects a low trust in the prefix announcement. Each of the scores are summed to generate a validation score, where acceptance of the prefix announcement is associated with lower validation scores and denial of the prefix announcement is associated with higher validation scores. In an implementation, the scoring logic may be reversed or inverted. The validation score is then compared against a security threshold. In an implementation, the security threshold is set by a service provider, for example, as described herein. A notification is sent to the router regarding a validation status of the prefix announcement.

The one or more validation protocols or algorithms include, but is not limited to, prefix lists, AS-Path filters, pulling routing assets database (RADb) data, Internet routing registry (IRR) filters, setting maximum prefix limits, resource public key infrastructure (RPKI), secure origin signing, path security tracking, topology matching, path longevity, specific route overlapping, geographic boundary crossings, and the like.

In an implementation, a prefix list consists of IP addresses and associated bit masks for each IP address. The prefix lists may be configured in various ways to deny a non-matching or non-present prefixes in the prefix announcement. In an implementation, the logic may be reversed or inverted. A score is assigned based on the result of the matching. Implementation of prefix lists is known to those of skill in the technology or art.

In an implementation, AS-Path filters permit or deny prefixes in the prefix announcement from certain autonomous systems. The AS-Path filters may be configured in various ways. In an implementation, the AS-Path filter can accept only prefixes from directly connected autonomous systems. In an implementation, the AS-Path filter can accept only prefixes from directly connected autonomous systems and one autonomous system behind the first one. In an implementation, the AS-Path filter can deny certain transit autonomous systems. A score is assigned based on the result of the filtering. Implementation of AS-Path filters is known to those of skill in the technology or art.

In an implementation, pulling RADb data to check or confirm the origin of the prefix announcement. A score is assigned based on the result of the confirmation. Implementation of pulling RADb data is known to those of skill in the technology or art.

In an implementation, IRR filters are used to check route data. A score is assigned based on the result of the filtering. Implementation of IRR filters is known to those of skill in the technology or art.

In an implementation, the setting maximum prefix limits feature can be used to allow a router to bring down a peer when the number of received prefixes from that peer exceeds the configured Maximum-Prefix limit. A score is assigned based on the result of the comparison. Implementation of setting maximum prefix limits is known to those of skill in the technology or art.

In an implementation, RPKI is a cryptographic method of signing records that associate a route announcement with the correct originating autonomous system number. A score is assigned based on the result of the origin comparison. Implementation of RPKI is known to those of skill in the technology or art.

In an implementation, secure origin signing methods and devices include components (e.g., a route origination entity component, receiver component, etc.) configured to perform distributed prefix signing border gateway protocol (BGP) security methods and is described in U.S. patent application Ser. No. 16/554,798, filed on Aug. 29, 2019, and entitled "Border Gateway Protocol (BGP) Hijacks Prefix Signing Using Public/Private Keys", the contents of which are incorporated by reference in its entirety as if set forth herein. An origination entity component/device may be configured to sign prefixes with a private key, include the signature in a transitive BGP attribute field, and publish the corresponding public key in a Domain Name Service (DNS) text record. A receiver component/device may be configured to receive a BGP prefix from the originating party, query the WHOIS for their Regional Internet Registry (RIR) to retrieve the DNS for the organization that owns the block/prefixes, use that DNS record and/or an internet protocol (IP) address "address and routing parameter area" (ARPA) record to obtain nameserver and retrieve public key, and use the public to validate the prefixes. By performing the distributed prefix signing BGP security method, components configured in accordance with the embodiments may decentralize some of the tasks performed to achieve prefix validation. Such distribution is in closer alignment with the decentralized design of BGP, providing many of the same benefits of a centralized authority/security without the associated drawbacks discuss further below. In addition, by performing the distributed prefix signing BGP security method, components configured in accordance with the embodiments may also improve the security, performance and functioning of autonomous networks, service provider network, and the network components and user equipment devices that provide or use their services. A score is assigned based on the result of the secure origin signing.

In an implementation, path security tracking may provide transparency as to the local security measures implemented along an AS path and is described in U.S. patent application Ser. No. 15/990,861, filed on May 29, 2018, and entitled "Border Gateway Protocol (BGP) Security Measures Along Autonomous System (AS) Paths", the contents of which are incorporated by reference in its entirety as if set forth herein. The method may include receiving a packet for routing to a route prefix, determining any available paths to the route prefix, determining a security cost for each available path based at least in part on any path security attributes associated with that respective available path, modifying a path length for the available paths according to their respective security costs, selecting a path for routing the packet from the available paths based at least in part on the modified path lengths, and routing the packet to the route prefix along the selected path. In various embodiments, modifying the path length for the available paths according to their respective security costs may include adding the security cost to a hop count for each respective available path. In various embodiments, the security costs may be values determined by applying one or more security discount associated with one or more types of security. In various embodiments, the path security attributes may be attributes indicated in BGP update messages received for the available paths. In various embodiments, the path security attributes may indicate one or more types of security applied by autonomous systems in the available paths. In various embodiments, selecting the path for routing the packet from the available paths based at least in part on the modified path lengths may include using the path security attributes as a tie breaker between paths having matching modified path lengths. A score is assigned based on the result of the path security tracking.

Figure 2A:
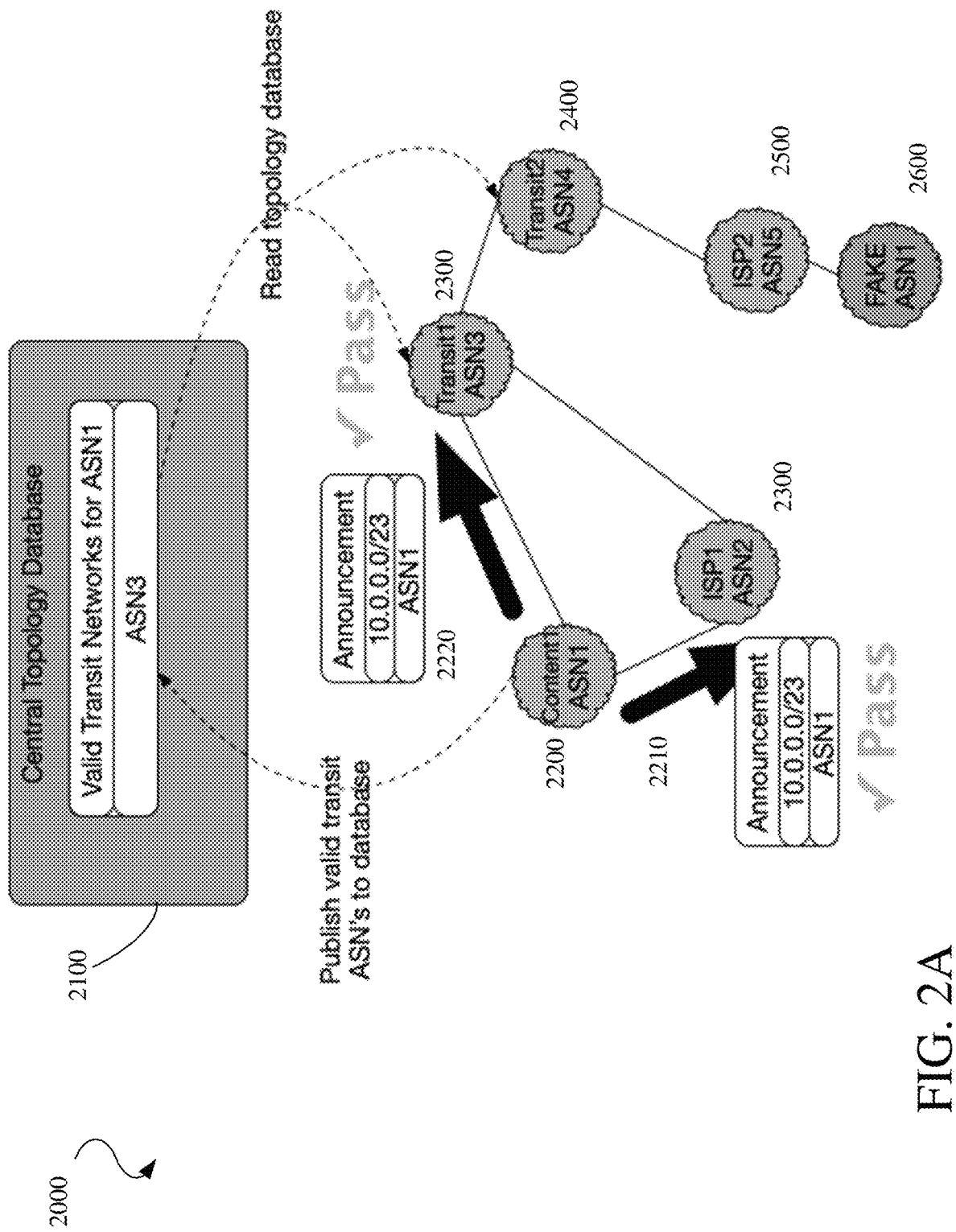
FIG. 2A is a diagram of an example topology for topology verification for out of path border gateway protocol validation in accordance with embodiments of this disclosure.
Figure 2B:
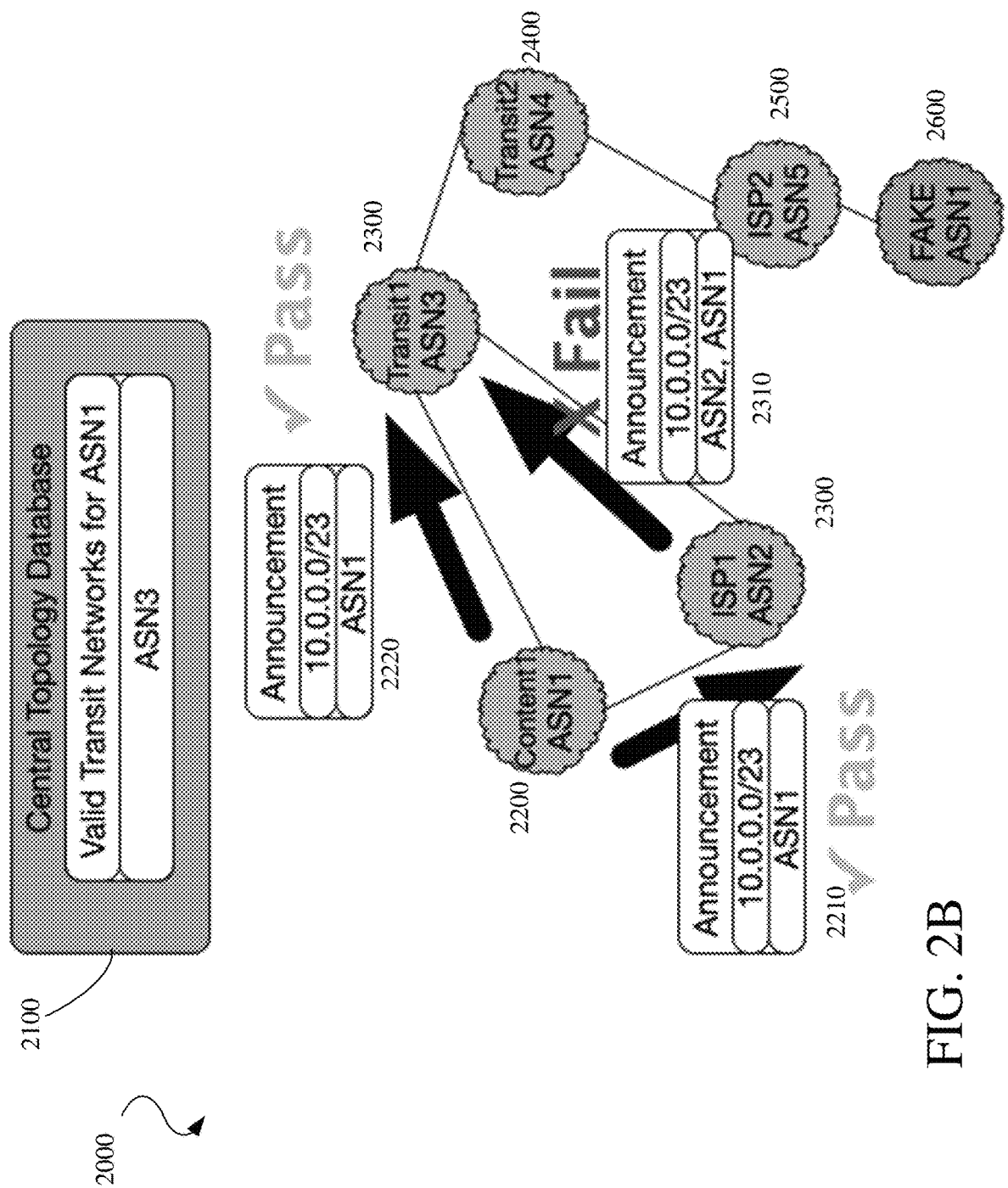
FIG. 2B is a diagram of an example of topology verification using the topology of FIG. 2A for out of path border gateway protocol validation in accordance with embodiments of this disclosure.
Figure 2C:
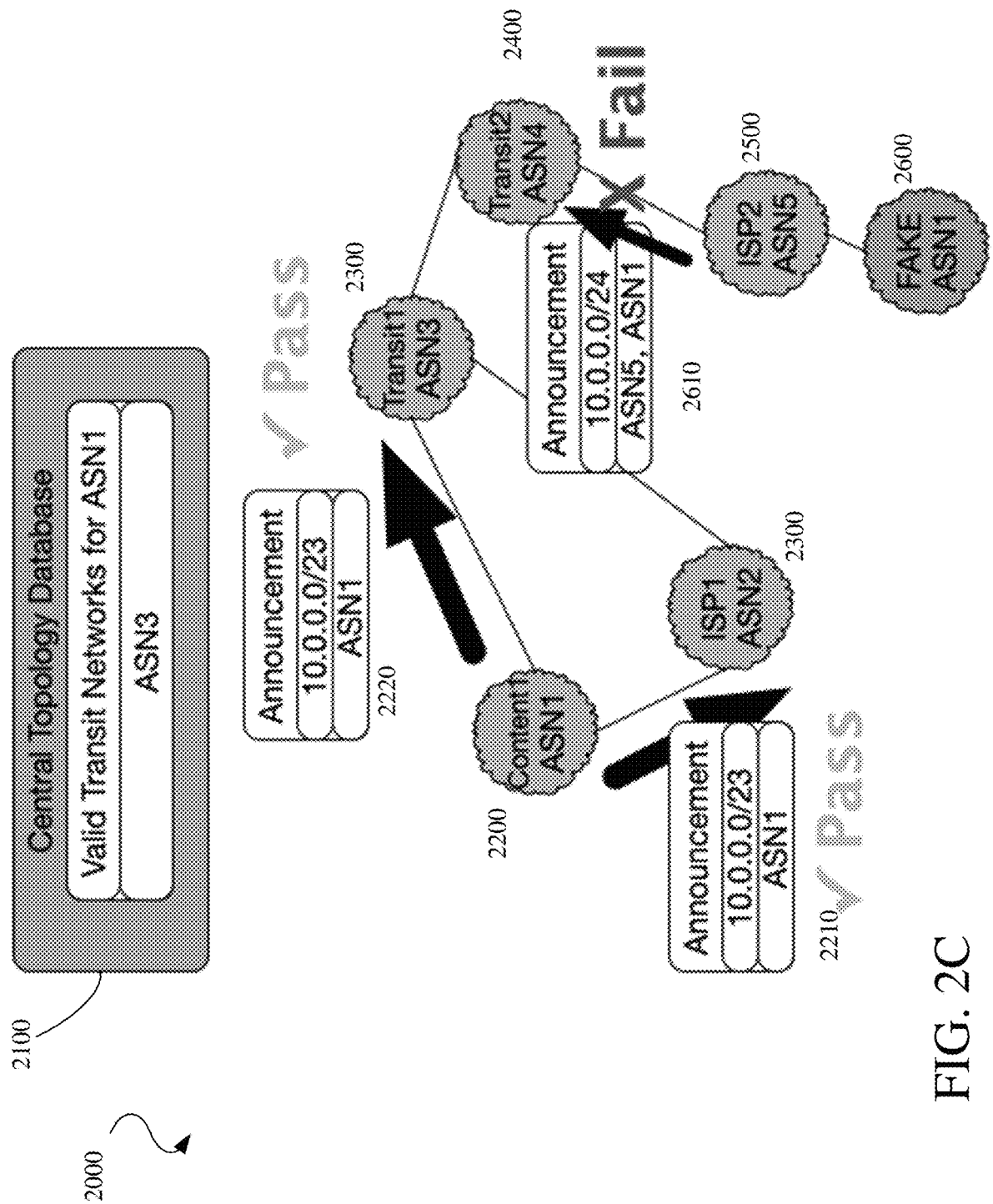
FIG. 2C is a diagram of an example of topology verification using the topology of FIG. 2A for out of path border gateway protocol validation in accordance with embodiments of this disclosure.

In an implementation, topology matching determines if a prefix announcement matches a published topology. A score is assigned based on the result of the topology matching. FIGS. 2A-C are diagrams of examples of topology verification for out of path border gateway protocol validation in accordance with embodiments of this disclosure.

FIG. 2A is a diagram of an example topology architecture 2000 for topology verification for out of path border gateway protocol validation in accordance with embodiments of this disclosure. The topology architecture 2000 includes a central topology database 2100 for publishing valid routing data or information for an entity represented by or assigned an ASN. The central topology database 2100 is a public readable and accessible database. The illustrative topology architecture 2000 further includes Content1 ASN1 2200, ISP1 ASN2 2300, Transit1 ASN3 2400, Transit2 ASN4 2500, ISP2 ASN5 2600, and FAKE ASN1 2700. In this instance, the Content1 ASN1 2200 publishes Transit1 ASN3 2400 as a valid transit ASN for Content1 ASN1 2200 and makes successful prefix announcements 2210 and 2220 to Transit1 ASN3 2400 and ISP1 ASN2 2300, respectively. In the latter case, although a private peering relationship is established, ISP1 ASN2 2300 is not granted transmit permission.

FIG. 2B is a diagram of an example of topology verification using the topology of FIG. 2A for out of path border gateway protocol validation in accordance with embodiments of this disclosure. In this instance, ISP1 ASN2 2300 has leaked a prefix announcement 2310 to Transit1 ASN3 2400. A controller for Transit1 ASN3 2400, for example controller 1300, determines that ISP1 ASN2 2300 is not an authorized transit network for Content1 ASN1 2200, scores it accordingly, and notifies Transit1 ASN3 2400. In this case, the prefix announcement 2310 is denied.

FIG. 2C is a diagram of an example of topology verification using the topology of FIG. 2A for out of path border gateway protocol validation in accordance with embodiments of this disclosure. In this instance, ISP2 ASN5 2600 spoofs a prefix announcement 2610 from FAKE ASN1 2700. A controller for Transit2 ASN4 2500, for example controller 1300, determines that ISP2 ASN5 2600 is not an authorized transit network for Content1 ASN1 2200, scores it accordingly, and notifies Transit1 Transit2 ASN4 2500. In this case, the prefix announcement 2610 is denied and the spoof attack is mitigated.

In an implementation, path longevity of the prefix announcement is determined. A score is assigned based on how new or old the prefix announcement is. The controller 1300 is configured to keep or maintain a state of a route path in contrast to network components such as routers which are stateless. By caching historic records, the controller 1300 can validate a BGP table through convergence by accepting previously validated path routes.

Traditionally BGP security has not been able to leverage path longevity behavior because validation is largely done on routers that do not keep historic record of the BGP table and are unable to distinguish between them. Most prefix leaks in the BGP table do not last longer than 24 hours. A majority of the prefixes in the BGP table rarely change, remaining routed through the same networks for months. This allows a significantly more relaxed policy for long known paths and higher scrutiny for newly announced paths to pass validation checks in order to be accepted. For example, newly announced route paths are more likely to be invalid than route paths that have remained unchanged for significant periods of time. Many route paths rarely change so by adding the ability to keep state and place more trust in older prefix announcements, the impact of false negatives or positives is reduced. In other word, the prefixes most likely to fail validation are new announcements where falsely refusing a valid route would also have the least likelihood of impact.

In an implementation, level of specific route overlapping is determined. A score is assigned based on the level of overlap between a route path in the prefix announcement and an overlapped route path when the prefix announcement is from a ASN different than the overlapped route path. BGP default rules prefer the most specific route available. It is common for organizations to sometimes send more specific path routes which are covered by larger aggregate route paths. However, it is less common for a different network to announce an overlapping prefix. In the case where an overlapping more specific prefix is sent from a different network, the controller 1300 considers whether the more specific route is likely to be a potential leak. This lowers the trust of that route path or prefix. The level of distrust should increase in relation to the number of unique ASN's in the AS_PATH of the overlapping prefix or route path.

In an implementation, the presence of geographic boundary crossings is considered. A score is assigned based on the presence of geographic boundary crossings in the route path in the prefix announcement, if route paths exist with no geographic boundary crossings, and/or how many geographic boundaries are crossed.

Figure 3:
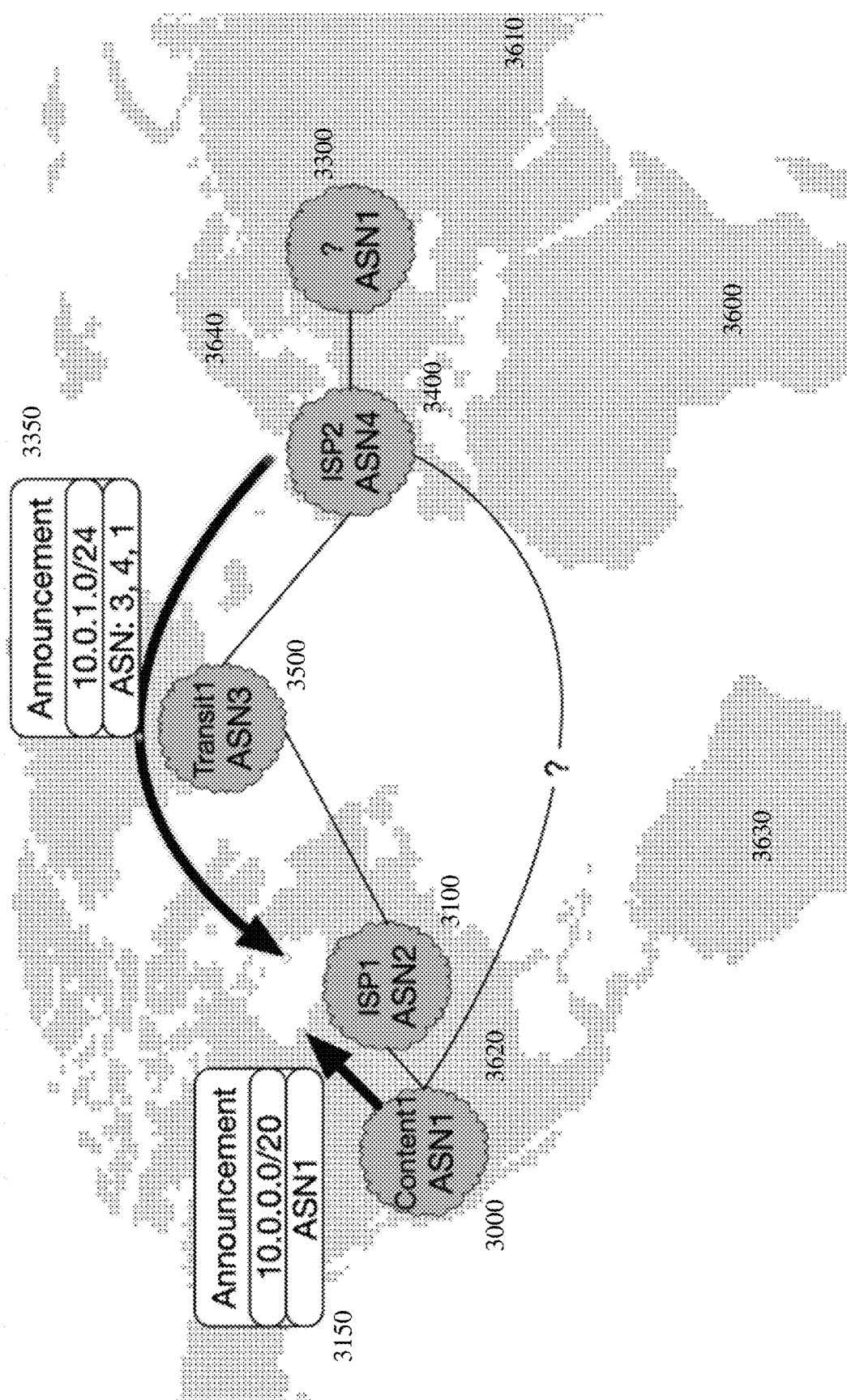
FIG. 3 is a block diagram of an example of geographic boundary crossings for out of path border gateway protocol validation in accordance with embodiments of this disclosure.

FIG. 3 is a diagram of an example of geographic boundary crossings for out of path border gateway protocol validation in accordance with embodiments of this disclosure. IP address blocks are broken up into major allocations controlled by 5 major Regional Internet Registries (RIR), where each RIR maintains a public database of IP address allocations and ASNs. For example, there is an African RIR 3600, an Asia-Pacific RIR 3610, an America RIR 3620, a Latin America and Caribbean RIR 3630, and a European RIR 3640. In the example, a Content1 ASN1 3000 makes a prefix announcement 3150 to an ISP1 ASN2 3100. In this case, the origin and destination ASNs are in the same region, America RIR 3620. A prefix announcement 3350 with a more specific route path is supposedly made from "?" ASN1 3300 to ISP1 ASN2 3100 via ISP2 ASN4 3400 and Transit1 ASN3 3500. However, the more specific route path crosses the European RIR 3640 before reaching ISP1 ASN2 3100 in the America RIR 3620. That is, the route path passes outside the geographic origin of the ASN, which in this case is the America RIR 3620. The controller 1300 should prefer route paths that do not cross regions. Route paths that cross regional boundaries should require higher scrutiny before being accepted as valid route paths.

As noted above, the controller 1300 the validation score is compared against a security threshold which is configurable based on a defined level of security. In an implementation, a configurable security threshold may have high security, medium security, low security, and fail. In an implementation, a high security level setting may need to pass several validation steps such as, for example, having no overlapping prefixes in the table announced by other ASNs, having a short AS-Path, not being routed outside the region of origin, and/or being known for a long time. This setting is most likely to impact valid traffic by not accepting a valid route in a timely manner or potentially at all. In an implementation, a medium security level setting may need high levels of validation only on newly announced prefixes and paths. Newly originated prefixes following best practices should still be able to propagate into the BGP table immediately. This setting should identify and deny most prefix hijacks with minimal impact to legitimate prefix announcements. In an implementation, a low security level setting accepts most of what is received with the exception of prefixes very likely to be hijacks.

In an illustrative example of the configurable security threshold, the security threshold is set to 50, which is associated with a medium security setting. Points are removed or subtracted based on factors like age of the announcement, overlapping with existing space, being RPKI valid, expected topologies and a number of other factors as described herein. In an implementation, the tests and weight of some of the tests can be adjusted over time to optimize against false positives and negatives. In an implementation, machine learning techniques may be used to adjust weights of tests, classify certain types of prefix announcements as trustworthy, classify certain types of prefix announcements as not trustworthy, and the like. An example validation score determination is shown in Table 1.

TABLE 1

Threshold = 50
Age of annooncement?
   <24 hours = +25
   <48 hours = +12
   <72 hours = +5
   >72 hours = 0
   >2 weeks = −25
Does the prefix overlap another one?
   If so does it come through the same AS_PATH as the aggregate?
   Yes = +5, no = +10
   If so does it come from a different geographic
   region than the aggregate?
   If no = 0, if yes = +30
Does it have a longer AS_PATH length than the aggregate route?
   +5 points per additional hop in AS_PATH length not counting prepends.
Has it been checked against RPKI and is it valid?
   Not checked = 0
   Invalid = +50
   Valid = −50
Is the prefix signed with valid private key? (Secure Origin)
   Not checked = 0
   Invalid = +50
   Valid = −50
What is the total AS_PATH length not counting prepends?
   Max +1 per hop in AS_PATH.

TABLE 1-continued

What is sum of the path security tracking score?
    Max +1 per hop in AS_PATH.
Is the path geographically scenic?
    +30 if geographic loop detected (returns to origin region
    after traversing through other regions)
    +5 per RIB region traversed in path
If AS topology is available for source does the A5_PATH match it?
    Not available = 0
    Does not match = +20
    Does match = −20
Accept if TotatScore <= ConfiguredThreshold The routers 1200, 1210, 1220, and 1230 and controller 1300 each include or operate a BGP monitor 1205, 1215, 1225, 1235, and 1305, respectively. The BGP monitors 1205, 1215, 1225, 1235, and 1305 can implement monitoring protocol or algorithms such as OpenBMP, OpenBGP, and the like. The BGP monitors 1205, 1215, 1225, and 1235 may implement, for example, a retrieval aspect of the BMP monitoring protocols and retrieves the route path data and information associated with the prefix announcement and passes the retrieved route path data and information to a BGP monitor 1305, which may implement, for example, a collector aspect of the BMP monitoring protocols.

Operationally, a router 1230 associated with a first ASN may make a prefix announcement to router 1220 associated with a second ASN, for example. In an implementation, the first ASN and the second ASN are different. The BGP monitor 1225 retrieves the prefix announcement and associated route path data and sends it to the controller 1300 via the BGP monitor 1305. The router 1220 denies acceptance of the prefix announcement. The controller 1300 applies one or more of the validation methods described herein and computes a validation score. The validation score is compared against a defined security threshold. In an implementation, a notification is sent by the controller 1300 to the router 1220 in the event of an acceptance of the prefix announcement. A lack of a notification would signal denial of the prefix announcement. In an implementation, a notification is sent by the controller 1300 to the router 1220 to indicate acceptance or denial of the prefix announcement. In an implementation, the notification is sent via the BGP monitor 1305 and BGP monitor 1225. In an implementation, the notification is sent via an API.

Figure 4:
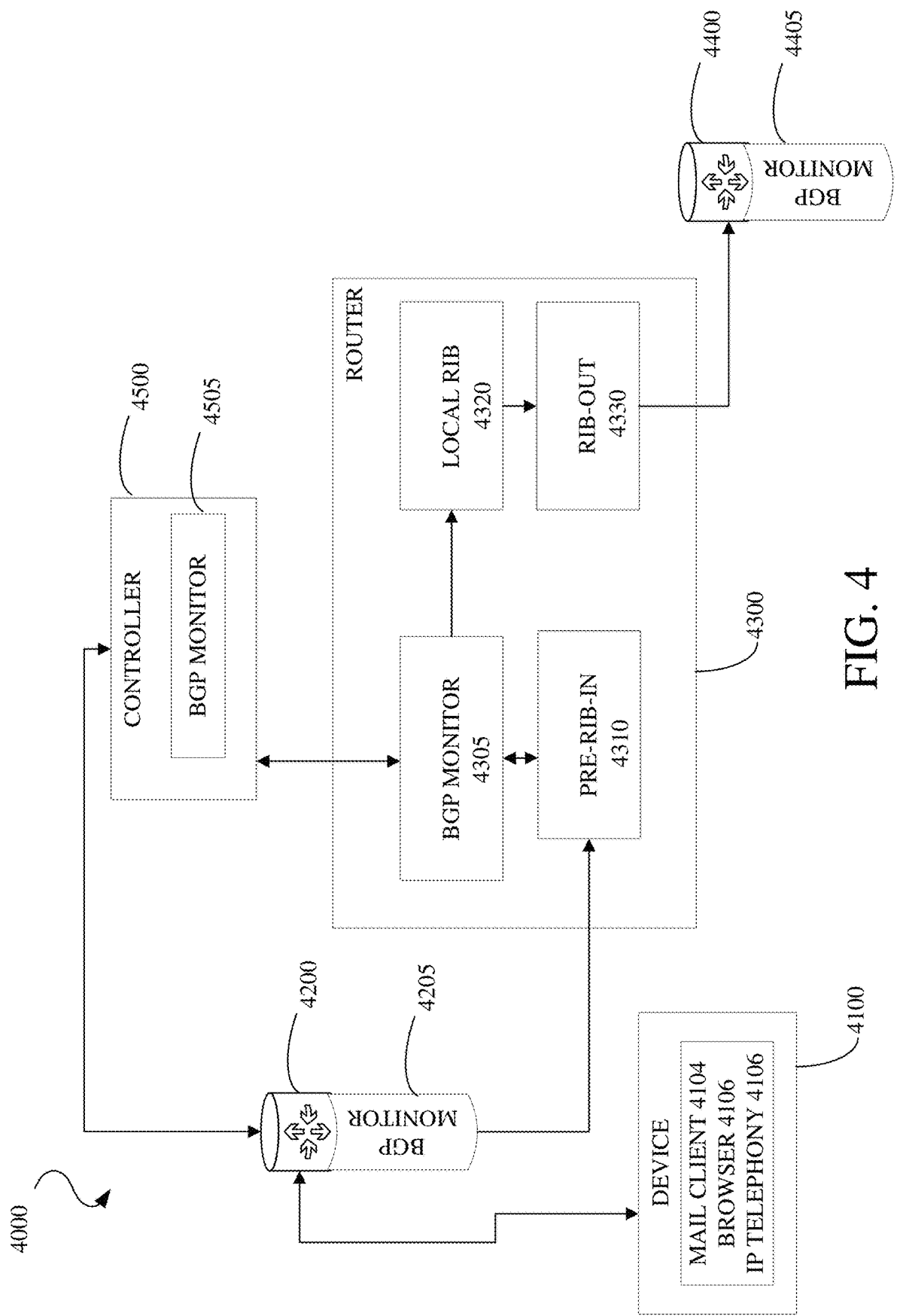
FIG. 4 is a diagram of an example architecture of an out of path border gateway protocol validation in accordance with embodiments of this disclosure.

FIG. 4 is a diagram of an example architecture 4000 using an out of path BGP validation controller 4500 in accordance with implementations or embodiments of this disclosure. In an implementation, the architecture 4000 may include a computing device 4100, routers 4200, 4300, and 4400, and the out of path BGP validation controller 4500. The computing device 4100 is connected to one router 4200, for example. The routers 4200, 4300, and 4400 are connected to an out of path BGP controller, such as the out of path BGP validation controller 4500. In an implementation, some of the routers 4200, 4300, and 4400 are interconnected with each other. The number of controllers is illustrative and there may be multiple controllers depending on the number of routers, geographic characteristics, traffic characteristics, and the like. In an implementation, the connections between the computing device 4100, routers 4200, 4300, and 4400, and the out of path BGP validation controller 4500 may be through a network(s) (not shown). The connections between the computing device 4100, routers 4200, 4300, and 4400, and the out of path BGP validation controller 4500 may be wired, wireless or a combination thereof. The architecture 4000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The network(s) may be, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and like including any combinations thereof.

The computing device 4100 may be, but is not limited to, customer premises equipment, end user devices, set-top boxes, personal computers (PCs), cellular telephones, Internet Protocol (IP) devices, computers, desktop computers, laptops, mobile devices, handheld computers, PDAs, personal media devices, smartphones, notebooks, notepads, phablets and the like. For example, in an implementation, the computing device 4100 may include applications such as, but not limited to, a mail application 4102, a web browser application 4104, an IP telephony application 4106, and the like, respectively. The computing device 4100 may receive and access services from other devices via the routers 4200, 4300, and 4400.

Each of the routers 4200, 4300, and 4400 may represent one or more routers. The routers 4200, 4300, and 4400 may be associated with the same or different service providers and each router 4200, 4300, and 4400 may have its own respective autonomous system number (ASN) assigned to it to distinguish one router from another router. The routers 4200, 4300, and 4400 may make prefix announcements to exchange routing information with one another in accordance with BGP. As described herein, the routers 4200, 4300, and 4400 are preset to deny acceptance of prefix announcements. The router 4300 includes a Pre-Routing Information Base (RIB)-IN database 4310, a local RIB 4320, and a RIB-OUT 4330. The RIB-IN database 4310 stores route paths received from a peer or neighboring router before they are accepted as valid or determined to be the best available path. The local RIB database 4320 stores the actual route paths that the router uses for routing. The RIB-OUT database 4330 stores route paths that the router chooses to send to neighboring routers. Although only shown with respect to router 4300, each router 4200 and 4400 is similarly implemented. The description herein uses routers, where a router may refer to any device capable of functioning as a router, such as an edge router, a core router, a boundary router, or any other type of router. A router may be any device that may be configured to forward data, such as Internet Protocol (IP) packets, from one device to computing device. The discussions of routers are illustrative and are not intended to limit the implementations in any way. Other network components may be used with the various implementations, and the other network components may be substituted in the examples without departing from the scope of the specification and/or claims.

The controller 4500 is a device which receives and analyzes routing data associated with prefix announcements which are sent between the routers 4200, 4300, and 4400. The controller 4500 applies one or more validation tests, protocols or algorithms (collectively "validation test") to the routing data as described herein and assigns a score. In an implementation, a low score is given if the applied validation test reflects high trust in the prefix announcement and a high score is given if the applied validation test reflects a low trust in the prefix announcement. Each of the scores are summed to generate a validation score, where acceptance of the prefix announcement is associated with lower validation scores and denial of the prefix announcement is associated with higher validation scores. In an implementation, the scoring logic may be reversed or inverted. The validation score is then compared against a security threshold. In an implementation, the security threshold is set by a service provider, for example, as described herein. A notification is sent to the router regarding a validation status of the prefix announcement. The validation tests, validation score, security threshold, and notification are as described with respect to FIGS. 1-3.

The routers 4200, 4300, and 4400, and the controller 4500 each include or operate a BGP monitor 4205, 4305, 4405, and 4505, respectively. The BGP monitors 4205, 4305, 4405, and 4505 can implement monitoring protocol or algorithms such as OpenBMP, OpenBGP, and the like. The BGP monitors 4205, 4305, and 4405 may implement, for example, a retrieval aspect of the BMP monitoring protocols and retrieves the route path data and information associated with the prefix announcement and passes the retrieved route path data and information to a BGP monitor 4505, which may implement, for example, a collector aspect of the BMP monitoring protocols.

Operationally, a router 4200 associated with a first ASN may make a prefix announcement to router 4300 associated with a second ASN, for example. In an implementation, the first ASN and the second ASN are different. The BGP monitor 4305 retrieves the prefix announcement and associated route path data and sends it to the controller 4500 via the BGP monitor 4505. The router 4300 denies acceptance of the prefix announcement. By sending the PRE-RIB-IN 4310 through the BGP monitor 4305 to the controller 4500 and configuring the router 4300 to deny all inbound prefixes, the responsibility of validating inbound routes can be farmed out to the controller 4500.

The controller 4500 applies one or more of the validation methods described herein and computes a validation score. The validation score is compared against a defined security threshold. In an implementation, a notification is sent by the controller 4500 to the router 4300 in the event of an acceptance of the prefix announcement. A lack of a notification would signal denial of the prefix announcement. In an implementation, a notification is sent by the controller 4500 to the router 4300 to indicate acceptance or denial of the prefix announcement. In an implementation, the notification is sent via the BGP monitor 4505 and BGP monitor 4305. In an implementation, the notification is sent via an API. In an implementation, the controller 4500 programs the local RIB 4320 instead of the router 4300. In an implementation, gRPC or like technique or protocol can be used to program the local RIB 4320. In an implementation, BGP route reflection can be used to program the local RIB 4320.

Figure 5:
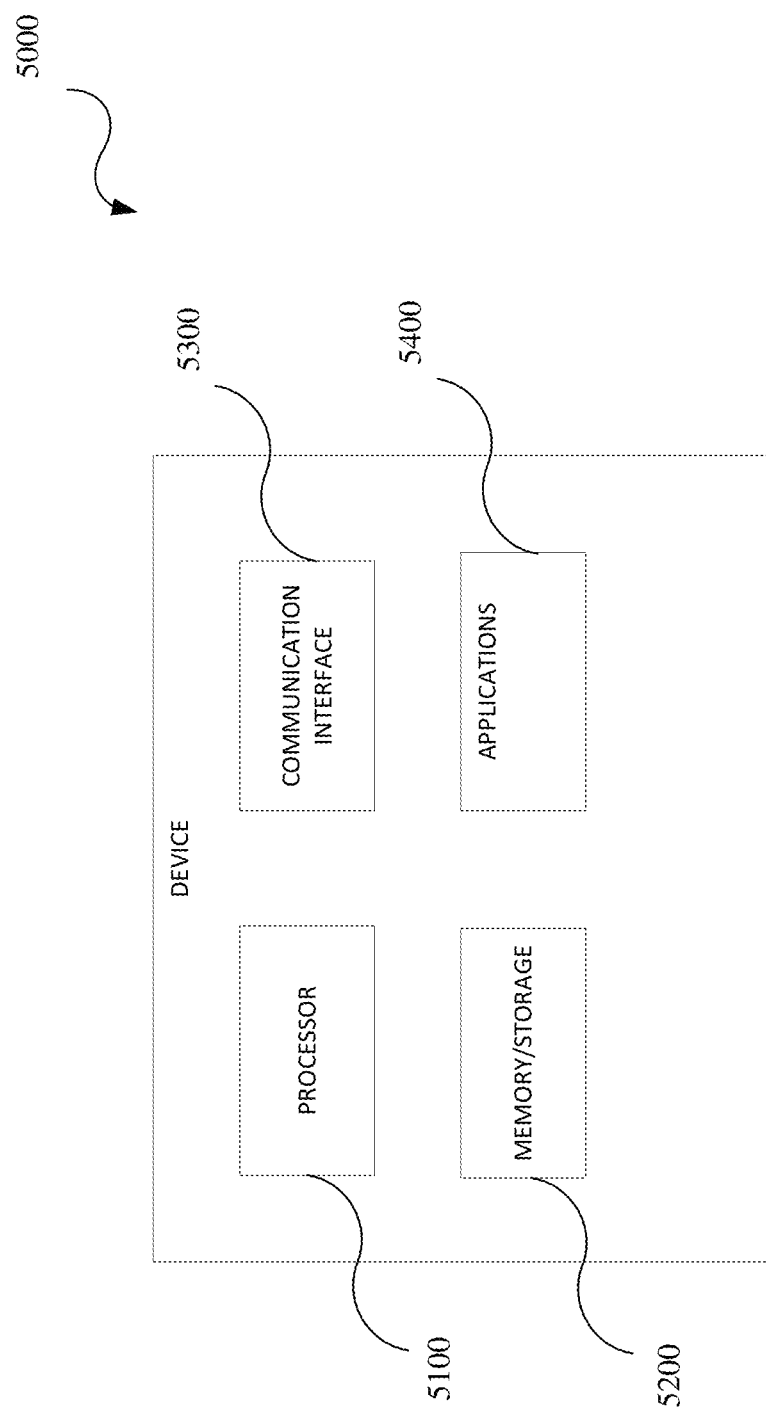
FIG. 5 is a block diagram of an example device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. The device 5000 may include or implement, for example, the computing devices 1100, 1110, and 1120 of FIG. 1, routers 1200, 1210, 1220, and 1230 of FIG. 1, the out of path BGP validation controller 1300 of FIG. 1, the computing device 4100 of FIG. 4, the routers 4200, 4300, and 4400 of FIG. 4, and the out of path BGP validation controller 4500 of FIG. 4, for example. The out of path BGP validation techniques or methods described herein may be stored in the memory/storage 5200 and executed by the processor 5100 in cooperation with the memory/storage 5200, the communications interface 5300, and applications 5400, as appropriate. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
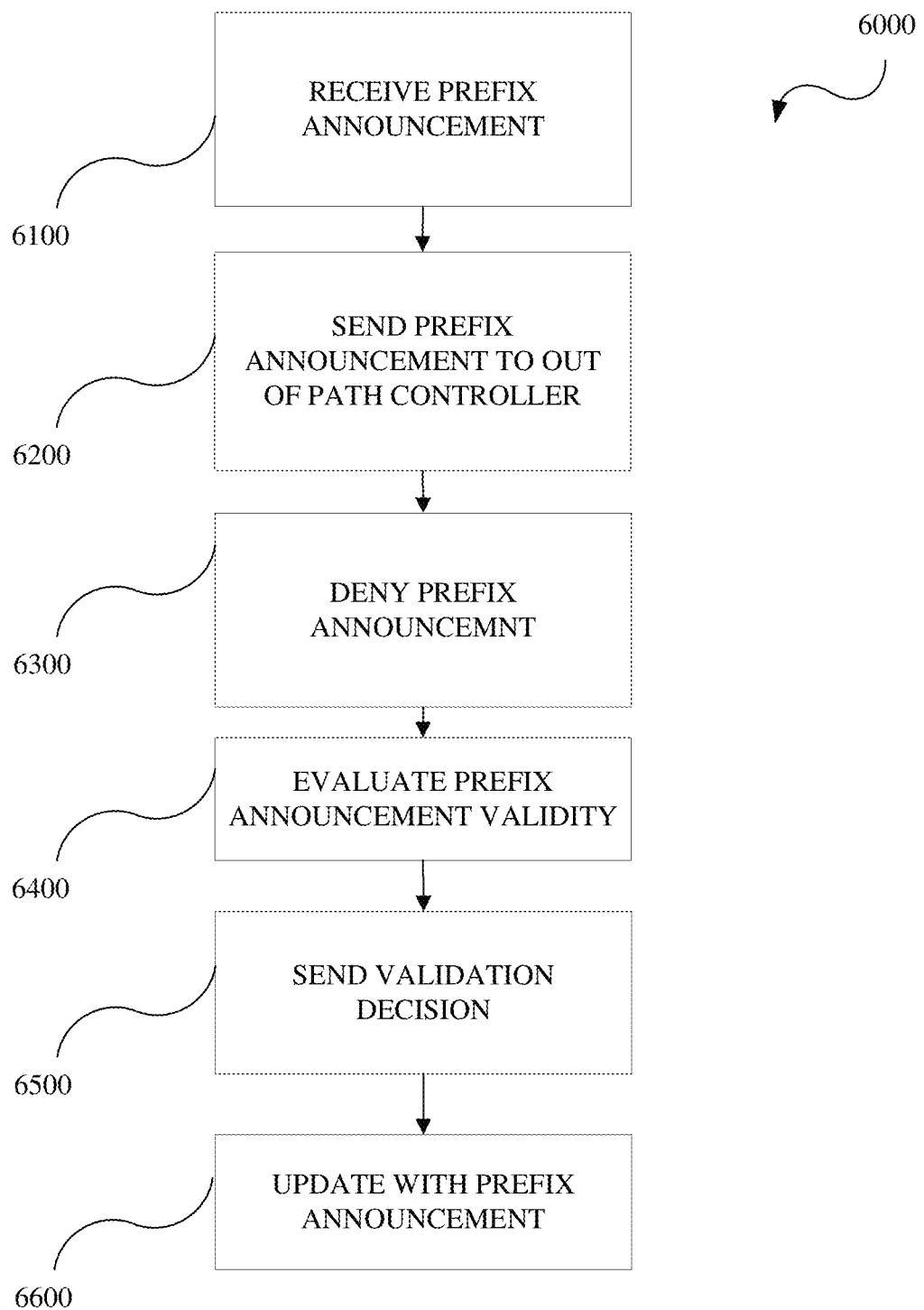
FIG. 6 is a flowchart of an example method for out of path border gateway protocol validation in accordance with embodiments of this disclosure.

FIG. 6 is a flowchart of an example method 6000 for out of path BGP validation in accordance with embodiments of this disclosure. The method 6000 includes: receiving 6100 a prefix announcement; sending 6200 the prefix announcement to an out of path BGP controller; denying 6300 the prefix announcement; evaluating 6400 the prefix announcement validity; sending 6500 a validation notification; and updating 6600 network component if positive validation. For example, the method or technique 6000 may be implemented, as applicable and appropriate, by the computing devices 1100, 1110, and 1120 of FIG. 1, routers 1200, 1210, 1220, and 1230 of FIG. 1, the out of path BGP validation controller 1300 of FIG. 1, the computing device 4100 of FIG. 4, the routers 4200, 4300, and 4400 of FIG. 4, and the out of path BGP validation controller 4500 of FIG. 4.

The method 6000 includes receiving 6100 a prefix announcement. A network component sends a prefix announcement to another network component, where each of the network components are in different networks. In an implementation, each network has a different ASN.

The method 6000 includes sending 6200 the prefix announcement to an out of path BGP controller. A BGP monitor retrieves and sends the prefix announcement to the out of path BGP controller.

The method 6000 includes denying 6300 the prefix announcement. In an implementation, a router is preset to deny all inbound prefix announcements.

The method 6000 includes evaluating 6400 the prefix announcement validity. The out of path BGP controller uses or applies one or more validation techniques as described herein. In an implementation, the out of path BGP controller applies the validation tests as described in method 7000 of FIG. 7. In an implementation, the route path data in the prefix announcement is analyzed against the metrics of the one or more validation techniques. The one or more techniques may include, but is not limited to, prefix lists, AS-path filtering, pulling RADb, IRR filtering, comparing to maximum prefix, RPKI, secure origin signing, path security tracking, topology tracking, path longevity, specific route overlapping, geographic boundary crossing, and the like. A validation score is determined from the scores generated from the one or more validation tests. The validation score is compared against a security threshold to determine validity of the prefix announcement. In an implementation, the security threshold is configurable between different security levels.

The method 6000 includes sending 6500 a validation notification. In an implementation, the out of path BGP controller sends a positive or negative notification to the router. In an implementation, the out of path BGP controller sends a positive notification to the router and an absence of a notification is a denial. In an implementation, the out of path BGP controller sends the notification via the BGP monitor. In an implementation, the out of path BGP controller sends the notification via an API.

The method 6000 includes updating 6600 network component if positive validation. The out of path BGP controller programs the router with the prefix announcement in the event of a positive validation. In an implementation, the out of path BGP controller programs the local RIB with the prefix announcement in the event of a positive validation. In an implementation, the out of path BGP controller programs the router with the prefix announcement using gRPC.

Figure 7:
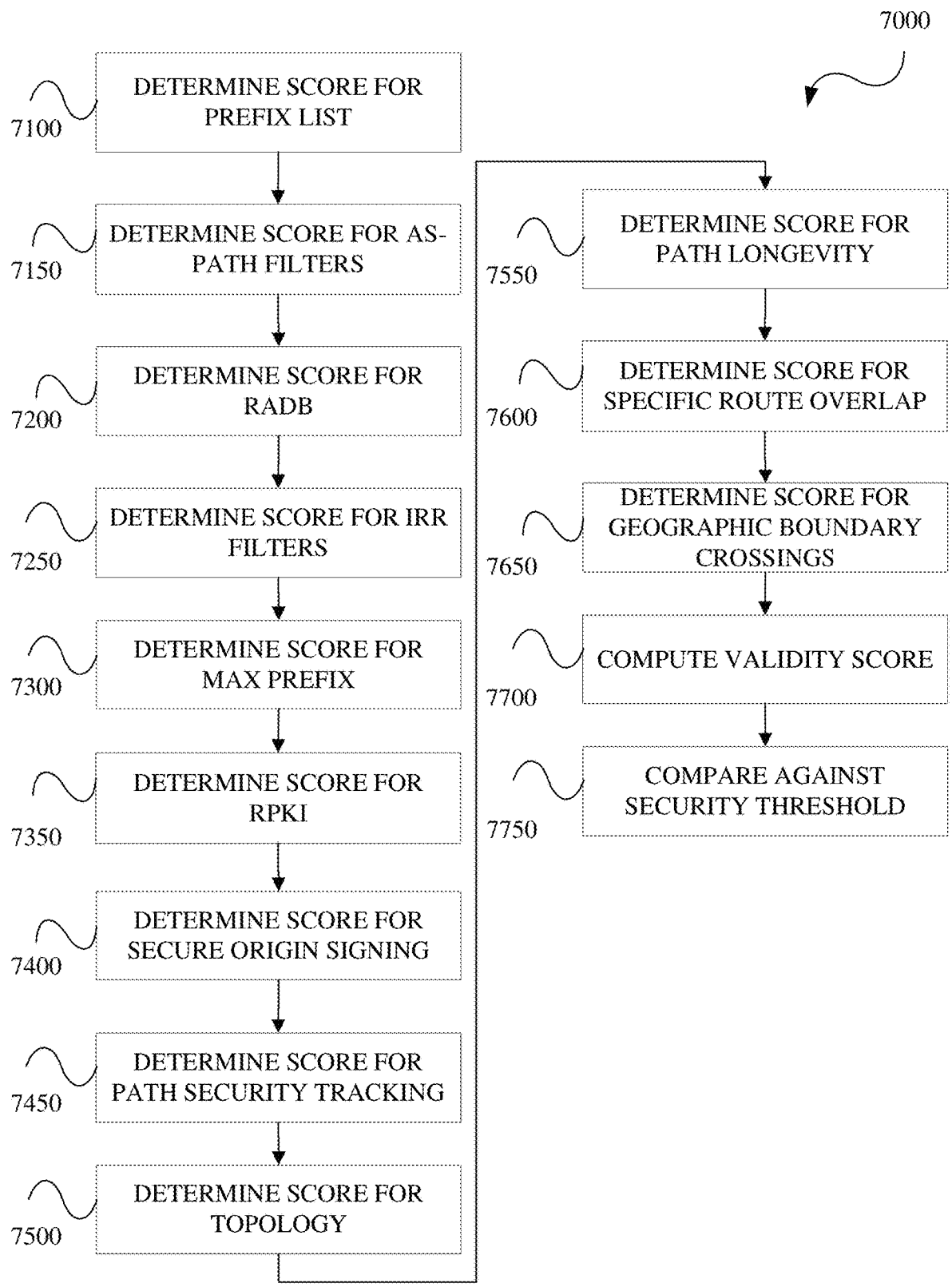
FIG. 7 is a flowchart of an example method for border gateway protocol validation for out of path border gateway protocol validation in accordance with embodiments of this disclosure.

FIG. 7 is a flowchart of an example method 7000 for out of path BGP validation in accordance with embodiments of this disclosure. The method 7000 includes: determining 7100 a score for a prefix list validation test; determining 7150 a score for a AS-path filter validation test; determining 7200 a score for RADb validation test; determining 7250 a score for IRR filter validation test; determining 7300 a score for maximum prefix validation test; determining 7350 a score for RPKI validation test; determining 7400 a score for secure origin signing validation test; determining 7450 a score for path security tracking validation test; determining 7500 a score for topology tracking validation test; determining 7550 a score for path longevity validation test; determining 7600 a score for specific route overlap validation test; determining 7650 a score for geographic boundary crossings validation test; computing 7700 a validation score; and comparing 7750 the validation score against a security threshold. For example, the method or technique 7000 may be implemented, as applicable and appropriate, by the computing devices 1100, 1110, and 1120 of FIG. 1, routers 1200, 1210, 1220, and 1230 of FIG. 1, the out of path BGP validation controller 1300 of FIG. 1, the computing device 4100 of FIG. 4, the routers 4200, 4300, and 4400 of FIG. 4, and the out of path BGP validation controller 4500 of FIG. 4.

The method 7000 includes determining 7100 a score for a prefix list validation test. A validation controller receives an inbound prefix announcement and associated route path data. The validation controller checks if the prefix is listed in a prefix list and assigns a score appropriately.

The method 7000 includes determining 7150 a score for a AS-path filter validation test. The validation controller applies the AS-path filters and assigns a score appropriately.

The method 7000 includes determining 7200 a score for RADb validation test. The validation controller pulls the origin data, checks if the prefix origin matches, and assigns a score appropriately.

The method 7000 includes determining 7250 a score for IRR filter validation test. The validation controller checks the route data against published data and assigns a score appropriately.

The method 7000 includes determining 7300 a score for maximum prefix validation test. The validation controller checks the number of prefix announcements that have been received from the announcing entity and assigns a score appropriately.

The method 7000 includes determining 7350 a score for RPKI validation test. The validation controller checks the originating autonomous system number and assigns a score appropriately.

The method 7000 includes determining 7400 a score for secure origin signing validation test. The validation controller checks the signature and assigns a score appropriately.

The method 7000 includes determining 7450 a score for path security tracking validation test. The validation controller checks the security attributes and assigns a score appropriately.

The method 7000 includes determining 7500 a score for topology tracking validation test. The validation controller checks whether the prefix announcement topology matches against published topology data and assigns a score appropriately.

The method 7000 includes determining 7550 a score for path longevity validation test. The validation controller checks the age of the route path data and assigns a score appropriately.

The method 7000 includes determining 7600 a score for specific route overlap validation test. The validation controller checks whether the prefix announcement includes a more specific route path that overlaps a previous route path, where the specific route path is from a different ASN or network, and assigns a score appropriately.

The method 7000 includes determining 7650 a score for geographic boundary crossings validation test. The validation controller checks if geographic boundaries have been crossed, are there overlapping route paths with no geographic boundaries, how many boundaries are crossed, and the like, and assigns a score appropriately.

The method 7000 includes computing 7700 a validation score. The validation controller computes a validation score from applied validation tests. In an implementation, one or more validation tests may be weighted greater or less than unity. In an implementation, the weighting may depend on a level of trustworthiness of the validation test. In an implementation, the weighting may depend on a level of trustworthiness of the prefix announcement. In an implementation, the weighting may depend on a level of trustworthiness of the originator of the prefix announcement. In an implementation, the weighting may depend on a combination of the described herein factors.

The method 7000 includes comparing 7750 the validation score against a security threshold. The validation controller compares the validation score against the security threshold. In an implementation, the security threshold is configurable between multiple security levels. In an implementation, the security threshold is set by a service provider.

In general, a method for out of path border gateway protocol (BGP) validation includes receiving, at a network component, a prefix announcement, denying, by the network component, acceptance of the prefix announcement, sending, via a BGP monitor at the network component, the prefix announcement to an out of path validation controller, evaluating, at the out of path validation controller, the prefix announcement against one or more validation tests, sending, by the out of path validation controller, a validation notification based on the one or more validation tests, and updating, the network component by the out of path validation controller, based on the validation notification. In an implementation, the method further includes setting the network component to deny all inbound prefix announcements. In an implementation, the method further includes retrieving, by the BGP monitor at the network component, the prefix announcement and receiving, by a BGP monitor at the out of path validation controller, the prefix announcement. In an implementation, the evaluation further includes at least one of determining a score for a prefix list validation test, determining a score for an autonomous system (AS)-path filter validation test, determining a score for a routing assets database (RADb) validation test, determining a score for an Internet routing registry (IRR) filter validation test, determining a score for a maximum prefix validation test, determining a score for a resource public key infrastructure (RPKI)validation test, determining a score for secure origin signing validation test, determining a score for a path security tracking validation test, determining a score for a topology tracking validation test, determining a score for a path longevity validation test, determining a score for a specific route overlap validation test, and determining a score for a geographic boundary crossings validation test. In an implementation, the evaluation further includes computing the validation score by summing scores from the one or more validation tests. In an implementation, the evaluation further includes comparing the validation score against a security threshold. In an implementation, the updating further includes programming, by the out of path validation controller, the network component with the prefix announcement for a positive validation notification. In an implementation, the local routing information base of the network component is programmed by the out of path validation controller with the prefix announcement for a positive validation notification.

In general, a system for out of path border gateway protocol (BGP) validation includes a non-route path server including a BGP monitor and a router including a BGP monitor, where the at least one router is configured to receive inbound prefix announcements and deny acceptance of the inbound prefix announcements, where the BGP monitor of the router configured to retrieve and send the inbound prefix announcements to the BGP monitor of the non-route path server, and where the non-route path server is configured to validate the inbound prefix announcements by comparing a validation score with a threshold, where the validation score is based on a plurality of route path tests and program the router with a validated inbound prefix announcement. In an implementation, the plurality of route path tests include at least a prefix list validation test, an autonomous system (AS)-path filter validation test, a routing assets database (RADb) validation test, an Internet routing registry (IRR) filter validation test, a maximum prefix validation test, a resource public key infrastructure (RPKI) validation test, a secure origin signing validation test, a path security tracking validation test, a topology tracking validation test, a path longevity validation test, a specific route overlap validation test, and a geographic boundary crossings validation test. In an implementation, the threshold is configurable to provide multiple levels of security. In an implementation, the router includes a local routing information base which is programmed by the non-route path server. In an implementation, the router includes a pre-policy routing information base IN module which is set to deny acceptance of the inbound prefix announcements.

In general, a method for out of path border gateway protocol (BGP) validation includes receiving, at an out of path server from a router, a denied inbound prefix announcement sent via a BGP monitoring protocol, computing, at the out of path server, a validation score for the denied inbound prefix announcement by applying a plurality of validation tests to the denied inbound prefix announcement, comparing, at the out of path server, the validation score against a security threshold, and programming, by the out of path server of the router, with the denied inbound prefix announcement for a positive validation. In an implementation, the method further includes setting the router to deny all inbound prefix announcements. In an implementation, the plurality of validation tests include at least a prefix list validation test, an autonomous system (AS)-path filter validation test, a routing assets database (RADb) validation test, an Internet routing registry (IRR) filter validation test, a maximum prefix validation test, a resource public key infrastructure (RPKI)validation test, a secure origin signing validation test, a path security tracking validation test, a topology tracking validation test, a path longevity validation test, a specific route overlap validation test, and a geographic boundary crossings validation test. In an implementation, the computing further includes computing a score for each of the plurality of validation tests. In an implementation, at least some of the plurality of validation tests have a scoring weight different than unity. In an implementation, the local routing information base of the router is programmed by the out of path server with the denied inbound prefix announcement for a positive validation. In an implementation, the security threshold is a configurable multi-level security setting.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for out of path border gateway protocol (BGP) validation, the method comprising:
   receiving, at a first network component of a network from a second network component of a different network, a prefix announcement;
   denying, by the first network component, acceptance of the prefix announcement;
   sending, via a BGP monitor at the first network component, the prefix announcement to an out of path validation controller;
   receiving, at the first network component from the out of path validation controller, the prefix announcement with a validation notification based on a validation score for one or more validation tests, where the prefix announcement is evaluated against the one or more validation tests at the out of path validation controller; and
   updating, the first network component by the out of path validation controller with the prefix announcement, based on the validation notification being associated with positive validation.

2. The method of claim 1, further comprising:
   setting the first network component to deny all inbound prefix announcements.

3. The method of claim 1, further comprising:
   retrieving, by the BGP monitor at the first network component, the prefix announcement.

4. The method of claim 1, wherein evaluation comprising at least one of:
   determining a score for a prefix list validation test;
   determining a score for an autonomous system (AS)-path filter validation test;
   determining a score for a routing assets database (RADb) validation test;
   determining a score for an Internet routing registry (IRR) filter validation test;
   determining a score for a maximum prefix validation test;
   determining a score for a resource public key infrastructure (RPKI) validation test;
   determining a score for secure origin signing validation test;
   determining a score for a path security tracking validation test;
   determining a score for a topology tracking validation test;
   determining a score for a path longevity validation test;
   determining a score for a specific route overlap validation test; and
   determining a score for a geographic boundary crossings validation test.

5. The method of claim 4, wherein the evaluation further comprising:
   computing the validation score by summing scores from the one or more validation tests.

6. The method of claim 5, wherein the evaluation further comprising:
   comparing the validation score against a security threshold.

7. The method of claim 1, wherein the updating further comprising:
   programming the first network component with the prefix announcement for a positive validation notification.

8. The method of claim 7, wherein a local routing information base of the first network component is programmed by the out of path validation controller with the prefix announcement for a positive validation notification.

9. A system for out of path border gateway protocol (BGP) validation, the system comprising:

a non-route path server; and a first physical router including a BGP monitor, wherein the first physical router is in a network and is configured to receive inbound prefix announcements from a second router in a different network and deny acceptance of the inbound prefix announcements, wherein the BGP monitor of the first physical router is configured to retrieve and send the inbound prefix announcements to the non-route path server, and wherein the non-route path server is configured to:

validate the inbound prefix announcements by comparing a validation score with a threshold, where the validation score is based on a plurality of route path tests applied to the inbound prefix announcements;

send to the first physical router an inbound prefix announcement of the inbound prefix announcements with a validation notification in response to the comparing; and program the first physical router with the inbound prefix announcement based on the validation notification being associated with a positive validation.

10. The system of claim 9, wherein the plurality of route path tests include at least a prefix list validation test, an autonomous system (AS)-path filter validation test, a routing assets database (RADb) validation test, an Internet routing registry (IRR) filter validation test, a maximum prefix validation test, a resource public key infrastructure (RPKI) validation test, a secure origin signing validation test, a path security tracking validation test, a topology tracking validation test, a path longevity validation test, a specific route overlap validation test, and a geographic boundary crossings validation test.

11. The system of claim 9, wherein the threshold is configurable to provide multiple levels of security.

12. The system of claim 9, wherein the first physical router includes a local routing information base which is programmed by the non-route path server.

13. The system of claim 9, wherein the first physical router includes a pre-policy routing information base IN module which is set to deny acceptance of the inbound prefix announcements.

14. A method for out of path border gateway protocol (BGP) validation, the method comprising:

receiving, at an out of path server from a first network component of a network, a denied inbound prefix announcement sent via a BGP monitoring protocol, wherein the denied inbound prefix announcement is an inbound prefix announcement received from a second network component of a different network and denied by the first network component;

sending, by the out of path server to the first network component, the denied inbound prefix announcement with a validation notification based on comparing a validation score for the denied inbound prefix announcement against a security threshold, wherein the validation score is computed at the out of path server by applying a plurality of validation tests to the denied inbound prefix announcement; and updating, by the out of path server, the first network component with the denied inbound prefix announcement based on a positive validation notification.

15. The method of claim 14, further comprising:

setting the first network component to deny all inbound prefix announcements.

16. The method of claim 14, wherein the plurality of validation tests include at least a prefix list validation test, an autonomous system (AS)-path filter validation test, a routing assets database (RADb) validation test, an Internet routing registry (IRR) filter validation test, a maximum prefix validation test, a resource public key infrastructure (RPKI) validation test, a secure origin signing validation test, a path security tracking validation test, a topology tracking validation test, a path longevity validation test, a specific route overlap validation test, and a geographic boundary crossings validation test.

17. The method of claim 16, wherein the computing further comprising:

computing a score for each of the plurality of validation tests.

18. The method of claim 16, wherein at least some of the plurality of validation tests have a scoring weight different than unity.

19. The method of claim 15, wherein a local routing information base of the first network component is programmed by the out of path server with the denied inbound prefix announcement for a positive validation.

20. The method of claim 14, wherein the security threshold is a configurable multi-level security setting.

* * * * *